United States Patent [19]
Zayhowski et al.

[11] Patent Number: 4,982,405
[45] Date of Patent: Jan. 1, 1991

[54] COUPLED-CAVITY Q-SWITCHED LASER

[75] Inventors: John J. Zayhowski, Pepperell; Aram Mooradian, Winchester, both of Mass.

[73] Assignee: Massachusette Institute of Technology, Cambridge, Mass.

[21] Appl. No.: 405,685

[22] Filed: Sep. 7, 1989

[51] Int. Cl.$^5$ ................................................ H01S 3/11
[52] U.S. Cl. .......................................... 372/10; 372/97
[58] Field of Search ..................................... 372/10, 97

[56] References Cited

U.S. PATENT DOCUMENTS

| | | | |
|---|---|---|---|
| 3,187,270 | 6/1965 | Kogelnik et al. | 372/97 |
| 4,387,344 | 6/1983 | Meyer | 372/97 |
| 4,550,410 | 10/1985 | Chenausky et al. | 372/97 |
| 4,622,671 | 11/1986 | Tsang | 372/19 |
| 4,734,380 | 3/1988 | Tsang | 372/44 |

Primary Examiner—William L. Sikes
Assistant Examiner—Robert E. Wise
Attorney, Agent, or Firm—Hamilton, Brook, Smith & Reynolds

[57] ABSTRACT

A Q-switched laser having a gain medium disposed within a first cavity and a second cavity whose optical path length is adjustable such that the quality of the first resonant cavity is affected. One aspect of the invention is the changing of the physical path length of the second cavity so as to affect the reflectivity of a mirror common to both cavities as seen from the first cavity. Another aspect of the invention is the incorporation, within the second cavity, of a material whose refractive index or absorption coefficient can be varied by the application of an electric field, a magnetic field, a temperature change or an applied pressure.

29 Claims, 3 Drawing Sheets

COUPLED-CAVITY Q-SWITCHED LASER

The Government has rights in this invention pursuant to Contract Number F19628-85-C-0002 awarded by the Office of the Air Force.

BACKGROUND OF THE INVENTION

This invention relates to the field of lasers.

Many applications require the generation of short pulses of light from a laser at a high repetition rate. One method for producing a rapid pulse of light is to Q-switch the laser. In Q-switching, the "quality" of the laser cavity is changed. One method for changing the quality of the cavity is to mechanically move one of the cavity mirrors into and out of alignment with the other mirror of the cavity. When the mirror is out of alignment, there is no resonant cavity and no lasing can occur. When the mirror is moved into alignment, the resonant cavity is formed and lasing begins. The large motions required to move the mirror into and out of alignment limit the rate at which the laser can be Q-switched.

Other Q-switching techniques allow rapid Q-switching of the laser, but require large intracavity devices which are incompatible with short cavity length lasers.

The present invention changes the Q of the resonant cavity in ways that permit rapid switching of the laser, and is particularly well suited for use with lasers having short cavity lengths.

SUMMARY OF THE INVENTION

The Q-switched laser according to the invention comprises a gain medium disposed within a first resonant cavity and a second resonant cavity disposed adjacent to the first resonant cavity and sharing a common partially transmitting mirror with said first resonant cavity. The optical path length of the second resonant cavity (physical length times refractive index) is adjustable such that the Q of the first resonant cavity containing the gain medium is affected.

In one embodiment, the optical path length of the second resonant cavity is varied by moving an output mirror.

In another embodiment, the second resonant cavity comprises an electro-optical material whose index of refraction varies in response to an externally applied electric field.

In yet another embodiment, the material within the second resonant cavity is a non-linear optical material which changes its index of refraction in response to a second light beam incident upon the non-linear optical material.

In still yet another embodiment the optical material disposed within the second cavity changes its index of refraction in response to a temperature change.

In further yet another embodiment, the optical material located within the second cavity changes its index of refraction in response to a magnetic field.

In yet another embodiment, the second resonant cavity comprises an electro-optical material whose absorption coefficient changes in response to an externally applied electric field.

In a still further embodiment, the second resonant cavity further comprises an external coupling mirror whose reflectivity changes in response to a potential placed across the mirror.

In another embodiment, the net gain of the first cavity is reduced by changing the optical path length of the second cavity such that the intensity of the laser light is diminished but not turned off.

BRIEF DESCRIPTION OF THE DRAWING

A more complete understanding of the invention may be obtained from the following detailed description when taken in conjunction with the drawings, in which.

DESCRIPTION OF THE PREFERRED EMBODIMENT

Theory

Figure 1A:
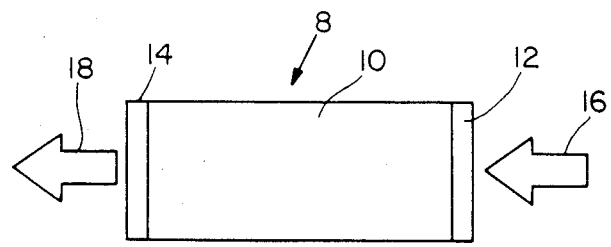
FIG. 1(a) is a cross-sectional view of an embodiment of a laser known to the prior art.

Referring to FIG. 1(a), an active gain medium 10 disposed within a cavity 8 formed by two mirrors 12, 14 will lase 18 when excited by pump light 16, provided the gain resulting from the passage of the light between the mirrors 12, 14 exceeds the losses due to absorption, scattering and transmission through the mirrors. To prevent a laser from lasing, it is only necessary to change the reflectivity of one of the mirrors so that not as much light is reflected and thereby cause the gain in the medium to be exceeded by the losses.

Figure 1B:
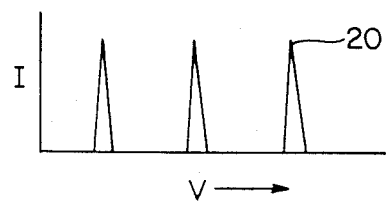
FIG. 1(b) is a graph which depicts the intensity verses frequency diagram for the laser of FIG. 1(a)

An active gain medium 10 disposed within a cavity 8 formed of two mirrors 12 and 14 will produce laser light of a frequency determined by the modes 20 (FIG. 1(b)) of the cavity. That is, the frequency of the laser light ($v$) will correspond to one of the cavity modes, given by the equation:

$$v = mc/2nl$$

where m is an integer, c is the speed of light, n is the refractive index within the cavity, and l is the cavity length.

Figure 1C:
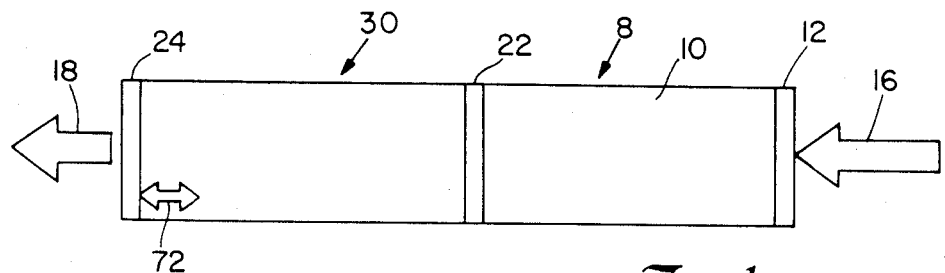
FIG. 1(c) is a cross-sectional view which depicts an embodiment of the invention wherein the laser of FIG. 1(a) is adjacent to a second cavity having a movable output coupling mirror.
Figure 1D:
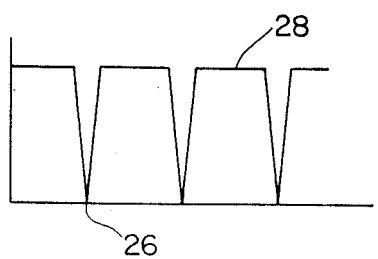
FIG. 1(d) is a graph of reflectivity verses frequency for a partially transparent mirror located between the gain medium and the second cavity of FIG. 1(c) as seen looking toward the mirror from the gain medium.

Referring to FIG. 1(c), if mirror 14 of resonant cavity 8 (FIG. 1(a)) containing gain medium 10 is replaced by a second optical resonant cavity 30 formed by two partially reflecting mirrors 22 and 24, with mirror 22 common to gain cavity 8 and second resonant cavity 30, the reflectivity of the mirror 22 as seen by the gain medium 10 looking toward the second resonant cavity 30 is determined by the resonant modes of the second resonant cavity 30. Referring to FIG. 1(d), at frequencies corresponding to the resonant frequencies of the second resonant cavity 30, the reflectivity 28 of the mirror 22 seen by the gain cavity 8 will be low, while away from the resonant frequencies of the second cavity 30, the reflectivity will be high. The resonant modes of the second resonant cavity 30 are determined by the optical length of the second resonant cavity 30 and can be changed, for example, by changing the physical length of the second cavity 30 by moving the output coupling mirror 24 as indicated by the double headed arrow 32.

It is therefore possible to prevent or permit the gain medium 10 to lase by adjusting the second resonant cavity 30 such that the resonances of the second cavity cause either low reflectivity in the common mirror, (therefore preventing lasing) or high reflectivity in the common mirror (therefore inducing lasing).

If the length of the gain cavity 8 is such that several longitudinal cavity modes can lase, the optical length of the second cavity 30 must be an integer multiple of the optical length of the gain cavity 8 if all the longitudinal lasing modes are to be suppressed simultaneously. If the gain cavity 8 supports only one possible lasing mode, then there is no such constraint on the second cavity.

Implementation

Referring again to FIG. 1(c), the optical length of the second resonant cavity 30 can be changed either by changing the refractive index of the cavity or by changing the cavity's physical length. The embodiment shown in FIG. 1(c) changes the physical length of the second resonant cavity 30 by moving the output coupling mirror 24 in the direction of the cavity axis (indicated by the doubled headed arrow 32). Such a mirror 24 can be moved piezoelectrically very rapidly thereby producing a series of laser pulses 18 as the resonance modes of the second cavity 30 cause the reflectivity of the mirror 22, as seen by the gain medium 10 in the gain cavity 8, to vary.

Figure 2A:
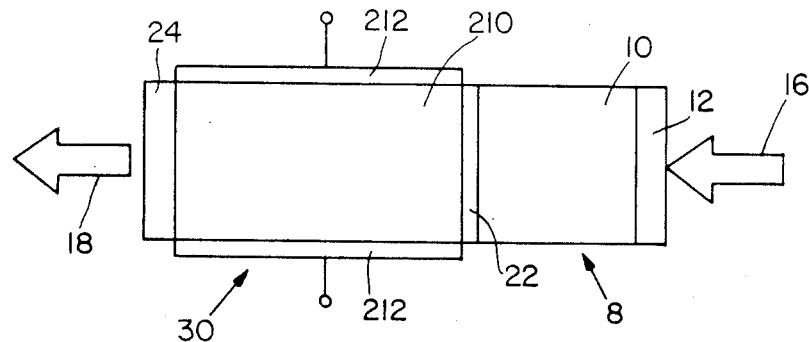
FIG. 2(a) is a schematic diagram of an embodiment of the invention wherein the second resonant cavity comprises an electro-optical material.

FIG. 2(a) shows another embodiment of the invention similar to that of FIG. 1(c) except that the optical path length of the second cavity 30 is changed not by moving the output coupling mirror 24 but instead by applying a voltage between two electrodes 212 disposed adjacent to an electro-optical material 210. An electro-optical material changes its index of refraction in response to an electric field, causing the minimum in the reflectivity versus frequency curve to shift, thereby varying the reflectivity of the mirror 22 as seen by the gain medium 10 in the gain cavity 8.

Examples of such electro-optical materials are the semiconductors, which can be engineered so as to produce a change in their index of refraction in a specific portion of the spectrum. For example, gallium-aluminum-arsenide is suitable for applications involving the near infra-red region of the spectrum, while cadmium sulfide is suitable for visible light applications. Further, lithium niobate and potassium niobate are also used as electro-optical materials although lithium niobate undergoes photodamage and as such may be unsuitable for extended use. Other materials with electro-optical properties are well known and are discussed in the *Handbook of Laser Science and Technology*—Vol. 4, part 2, section 2, Special Properties, subsection 2.1, Linear Electro-Optical Materials, CRC Press, Boca Raton, Fla. (1986) incorporated herein by reference.

In the embodiment shown schematically in FIG. 2(a), two electrodes 212 are placed on opposite sides of an electro-optical material 210 disposed between the partially transmitting common mirror 22 and the output coupling mirror 24. The index of refraction of this electro-optical material 210 may be changed at a high frequency by applying a high frequency electric field between the electrodes 212. The application of a varying electric field results in the production of a series of output pulses 18 as the reflectivity of the common mirror 22 seen by the gain medium 10 changes due to the resonances of the second cavity.

Figure 2B:
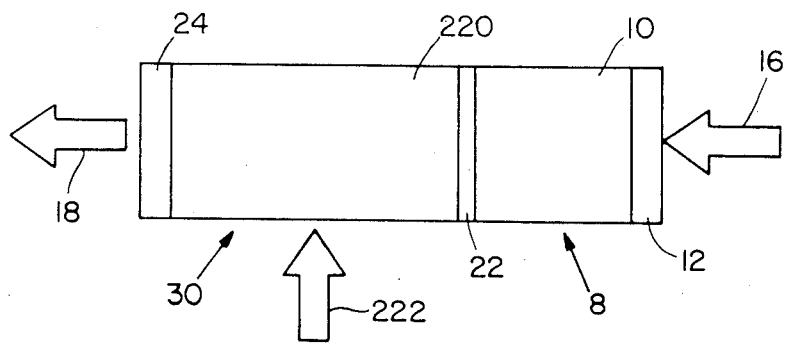
FIG. 2(b) is a schematic diagram of an embodiment of the invention wherein the second resonant cavity comprises a non-linear optical material.

Another embodiment of the invention is shown in FIG. 2(b). In this embodiment, a non-linear optical material 220, such as one of the semiconductors described in the previous embodiment, is disposed between the mirrors 22 and 24, and changes its index of refraction in response to a second incident laser beam 222 directed othogonally at the material 220. Materials with this non-linear optical property are discussed in the *Handbook of Laser Science and Technology*—Vol. 3 Optical Materials, part 1, section 1, Non-Linear Optical Properties, CRC Press, Boca Raton, Fla. (1986) incorporated herein by reference. Again the change in the index of refraction caused by the second beam 222 results in a change in the reflectivity of the common mirror 22 as seen by the gain medium 10. In such a configuration one series of laser pulses from the beam 222 can be used to form another series of pulses 18.

Figure 2C:
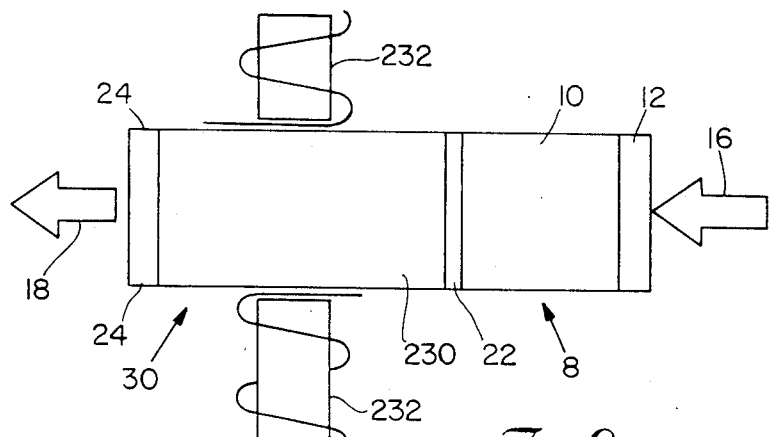
FIG. 2(c) is a schematic diagram of an embodiment of the device wherein the second resonant cavity comprises a magneto-optical material.

FIG. 2(c) shows an embodiment wherein the second resonant cavity comprises a magneto-optical material 230, such as yttrium-iron-garnet, whose index of refraction changes in response to an externally applied magnetic field. An electro-magnet 232 adjacent to the material 230 can be used to change the index of refraction of the medium and hence the reflectivity of the mirror 22 as seen from the gain cavity 8, as described previously. Materials with this property, such as the magnetic spinels and garnets, are discussed in the *Handbook of Laser Science and Technology*, Vol. 4 Optical Materials, part 2, section 2, Special Properties, subsection 2.2, Magneto-optic Materials, CRC Press, Boca Raton, Fla. (1986) incorporated herein by reference.

Since most materials change their length in response to temperature changes, temperature can be used to modify the optical path length. Other materials, such as semiconductors, which have an index of refraction which changes in response to temperature independent of physical length changes, can also be used to change the reflectivity of the mirror 22 as seen by the gain medium 10 and hence the net gain of laser.

Since most materials also change their length in response to applied pressure, pressure can also be used to change the optical length of an optical material in the second resonant cavity, and hence the reflectivity of the mirror 22 as seen by the gain medium 10. Additionally, certain materials such as yttrium-aluminum-garnet have a pressure dependent index of refraction and will change their index of refraction independent of the change in length of the material in response to pressure.

Figure 3:
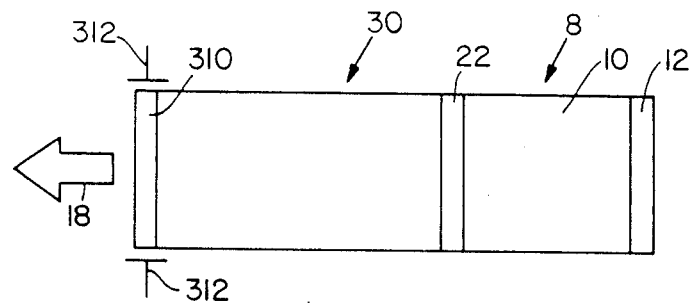
FIG. 3 is a schematic diagram of an embodiment of the invention wherein the reflectivity of the output coupling mirror is varied.

Referring to FIG. 3, the resonance of the second cavity 30 can also be changed by adjusting the reflectivity of an output coupling mirror 310. In this schematic drawing of the embodiment, electrodes 312 adjacent to the mirror 310 apply an electric field across the mirror, thereby changing its reflectivity. Mirrors with this property are easily fabricated using an etalon with an electro-optical material.

Referring again to FIG. 2(a), a further embodiment uses the change in the absorption coefficient of an electro-optical or non-linear optical material 210 in the second resonant cavity 30 to broaden the resonances of the second resonant cavity and thereby change the reflectivity of the mirror 22 seen by the gain medium 10. In such an embodiment, an electro-optical or non-linear optical material 210, such as a semiconductor operating near its band edge, is disposed within the second cavity 30. Such a material changes its absorption coefficient when an external electric field is applied, thereby changing the Q of the second cavity, and hence the reflectivity of mirror 22 as seen by the gain medium 10.

Figure 4:
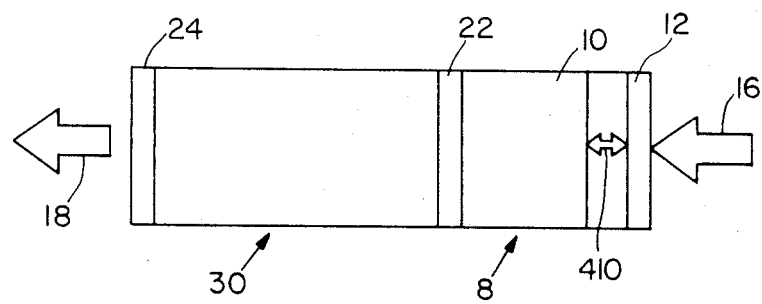
FIG. 4 is a schematic diagram of an embodiment of the invention wherein the length of the gain cavity is varied.

Referring to FIG. 4, it should also be understood that the optical length of the laser gain cavity 8 itself could be modified instead of modifying the optical length of the second cavity 30. In one such embodiment, the resonances of the gain cavity 8 are changed by physically changing the length of the cavity (as indicated by the double arrow 410) by moving the mirror 12. It is the change in the relative positions of the resonances of the gain cavity 8 and the second resonant cavity 30 that affect the reflectivity of the mirror 22 seen by the gain medium 10.

Figure 5:
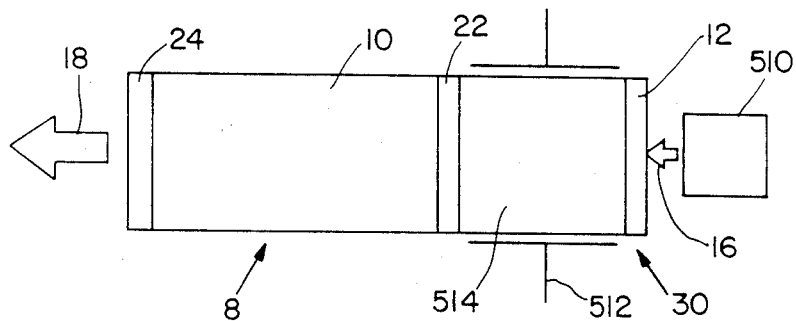
FIG. 5 is a schematic diagram of an embodiment of the invention in which the resonant cavity is placed between the gain medium and the pump light source.

In yet another embodiment, (FIG. 5) the second resonant optical cavity 30 is disposed between a pump light source 510 and the gain medium 10 and modulates the amount of pump light 16 striking the gain medium 10 within the gain cavity 8. For example, a second resonant cavity 30 containing an electro-optical material 514 whose index of refraction is varied by a voltage applied between electrodes 512 can be used to modulate the amount of pump light 16 striking the gain medium 10.

Finally, it should be realized that the second resonant optical cavity need not affect the gain cavity so much that the lasing is turned completely on or off. Instead, the second resonant cavity can be used to modulate the intensity of the light produced by the gain medium and not simply turn the laser light on and off.

Having described a number of embodiments, those skilled in the art will realize many variations are possible which will still be within the scope and spirit of the claimed invention. Therefore, it is the intention to limit the invention only as indicated by the scope of the claims.

What is claimed is:

1. A Q-switched laser comprising a gain medium disposed within a first resonant cavity and a second resonant cavity disposed adjacent to the first resonant cavity, the optical path length of the second resonant cavity being adjustable such that the net gain of the first resonant cavity containing said gain medium is affected through optical interactions with the second cavity.

2. The Q-switched laser of claim 1 wherein the optical path length of the second resonant cavity is varied by changes in the physical length of the second resonant cavity.

3. The Q-switched laser of claim 1 wherein the optical path length of the second resonant cavity is varied by changing the index of refraction of a material within the second resonant cavity.

4. The Q-switched laser of claim 3 wherein said material within said second resonant cavity has an index of refraction which varies in response to an external stimulus applied to said material.

5. The Q-switched laser of claim 4 wherein the material within said second cavity comprises an electro-optical material whose index of refraction changes in response to an applied electric field.

6. The Q-switched laser of claim 5 wherein said electro-optical material is a semiconductor.

7. The Q-switched laser of claim 6 wherein said semiconductor is gallium-aluminum-arsenide.

8. The Q-switched laser of claim 6 wherein said semiconductor is cadmium sulfide.

9. The Q-switched laser of claim 5 wherein said electro-optical material is lithium niobate.

10. The Q-switched laser of claim 5 wherein said electro-optical material is potassium niobate.

11. The Q-switched laser of claim 4 wherein the material within said second resonant cavity comprises a non-linear optical material which changes its index of refraction in response to a light beam incident upon the non-linear optical material.

12. The Q-switched laser of claim 11 wherein said non-linear optical material is lithium niobate.

13. The Q-switched laser of claim 11 wherein said non-linear optical material is potassium niobate.

14. The Q-switched laser of claim 11 wherein said non-linear optical material is a semiconductor.

15. The Q-switched laser of claim 14 wherein said semiconductor is gallium-aluminum-arsenide.

16. The Q-switched laser of claim 14 wherein said semiconductor is cadmium sulfide.

17. The Q-switched laser of claim 4 wherein the material disposed within said second resonant cavity changes its index of refraction in response to a change in the temperature of the material.

18. The Q-switched laser of claim 4 wherein said material located within said second cavity changes its index of refraction in response to a magnetic field.

19. The Q-switched laser of claim 18 wherein said material located within said second cavity which changes its index of refraction in response to a magnetic field is a magnetic spinel.

20. The Q-switched laser of claim 18 wherein said material located within said second cavity which changes its index of refraction in response to a magnetic field is a magnetic garnet.

21. The Q-switched laser of claim 1 wherein said second resonant cavity comprises an electro-optical material whose absorption coefficient changes in response to an applied electric field.

22. The Q-switched laser of claim 21 wherein said electro-optical material comprises a semiconductor operated near its band edge.

23. The Q-switched laser of claim 1 wherein said second resonant cavity comprises an electro-optical material whose absorption coefficient changes in response to light.

24. The Q-switched laser of claim 23 wherein said electro-optical material comprises a semiconductor operated near its band edge.

25. The Q-switched laser of claim 1 wherein said second resonant cavity further comprises an external coupling mirror whose reflectivity changes in response to an external stimulus to the mirror.

26. The Q-switched laser of claim 25 wherein said external coupling mirror whose reflectivity changes in response to an external stimulus to the mirror comprises an etalon comprising an electro-optical material.

27. The Q-switched laser of claim 1 wherein the intensity of the light produced by the first cavity is changed by changing the optical path length of the second cavity such that the intensity of the light produced by the first cavity is diminished but not turned off.

28. A Q-switched laser comprising a gain medium disposed within a first resonant cavity and a second resonant cavity disposed adjacent to the first resonant cavity, the optical path length of the first resonant cavity being adjustable such that the net gain of the first resonant cavity containing said gain medium is affected through optical interactions with the second cavity.

29. A Q-switched laser comprising a gain medium disposed within a first resonant cavity and a second resonant cavity disposed adjacent to the first resonant cavity, between the first resonant cavity and an optical pump, the optical path length of the second resonant cavity being adjustable such that the net gain of the first resonant cavity containing said gain medium is affected through optical interactions with the second cavity.

* * * * *